US012594927B2

(12) United States Patent
Raman et al.

(10) Patent No.: US 12,594,927 B2
(45) Date of Patent: Apr. 7, 2026

(54) SYSTEM FOR AN INTERNAL COMBUSTION ENGINE WITH AN ELECTRIC TORQUE ASSIST

(71) Applicant: INDIA NIPPON ELECTRICALS LIMITED, Hosur (IN)

(72) Inventors: Umashankar Raman, Krishnagiri (IN); Ashok Kumar, Krishnagiri (IN)

(73) Assignee: INDIA NIPPON ELECTRICALS LIMITED, Hosur (IN)

( * ) Notice: Subject to any disclaimer, the term of this patent is extended or adjusted under 35 U.S.C. 154(b) by 0 days.

(21) Appl. No.: 18/574,015

(22) PCT Filed: Jun. 22, 2022

(86) PCT No.: PCT/IN2022/050569
§ 371 (c)(1),
(2) Date: Dec. 23, 2023

(87) PCT Pub. No.: WO2022/269635
PCT Pub. Date: Dec. 29, 2022

(65) Prior Publication Data
US 2025/0121814 A1 Apr. 17, 2025

(51) Int. Cl.
*B60W 20/19* (2016.01)
*B60W 10/06* (2006.01)
*B60W 10/08* (2006.01)

(52) U.S. Cl.
CPC ............ *B60W 20/19* (2016.01); *B60W 10/06* (2013.01); *B60W 10/08* (2013.01);
(Continued)

(58) Field of Classification Search
CPC ...... B60W 20/19; B60W 10/06; B60W 10/08; B60W 2510/0638; B60W 2510/0685;
(Continued)

(56) References Cited

U.S. PATENT DOCUMENTS 10,124,794 B2 11/2018 Akuzawa
2019/0249617 A1 8/2019 Crips et al.
2020/0070642 A1 3/2020 Jang

FOREIGN PATENT DOCUMENTS

CN 204615556 U 9/2015
TW M520155 U * 4/2016

OTHER PUBLICATIONS

International Search Report and Opinion for PCT/IN2022/050569, dated Oct. 13, 2022, 7 pages.
(Continued)

*Primary Examiner* — Brian P Sweeney
(74) *Attorney, Agent, or Firm* — Dority & Manning, P.A.

(57) ABSTRACT

Embodiments herein provide a system and method for using an Integrated Starter Generator (ISG) for electric torque assistance on specific strokes of a 2-stroke or 4-stroke Internal Combustion (IC) engine (300) with reduced inertial mass than a conventional inertial mass loaded IC engine in order to overcome a speed variation problem caused by the engine's lower inertia at low and idle speeds and thus meeting a crankshaft speed shortfall. Furthermore, enabling the 2-stroke and 4-stroke engines to run on a lean fuel-air mixture improves emissions at low and idling speeds, and leads to better IC engine emission control.

8 Claims, 9 Drawing Sheets

(52) U.S. Cl.
CPC ............... *B60W 2510/0638* (2013.01); *B60W 2510/0685* (2013.01); *B60W 2710/083* (2013.01)

(58) Field of Classification Search
CPC .... B60W 2710/083; B60W 2510/0652; B60K 6/485; B60K 6/26; B60K 2006/268; F02D 29/06; F02D 2250/24; F02N 11/04; F02N 2011/0896; F02N 2200/022
See application file for complete search history.

(56) References Cited

OTHER PUBLICATIONS

Supplementary European Search Report for EP 22827870, dated Apr. 16, 2025, 4 pages.

* cited by examiner

Figure 8A:
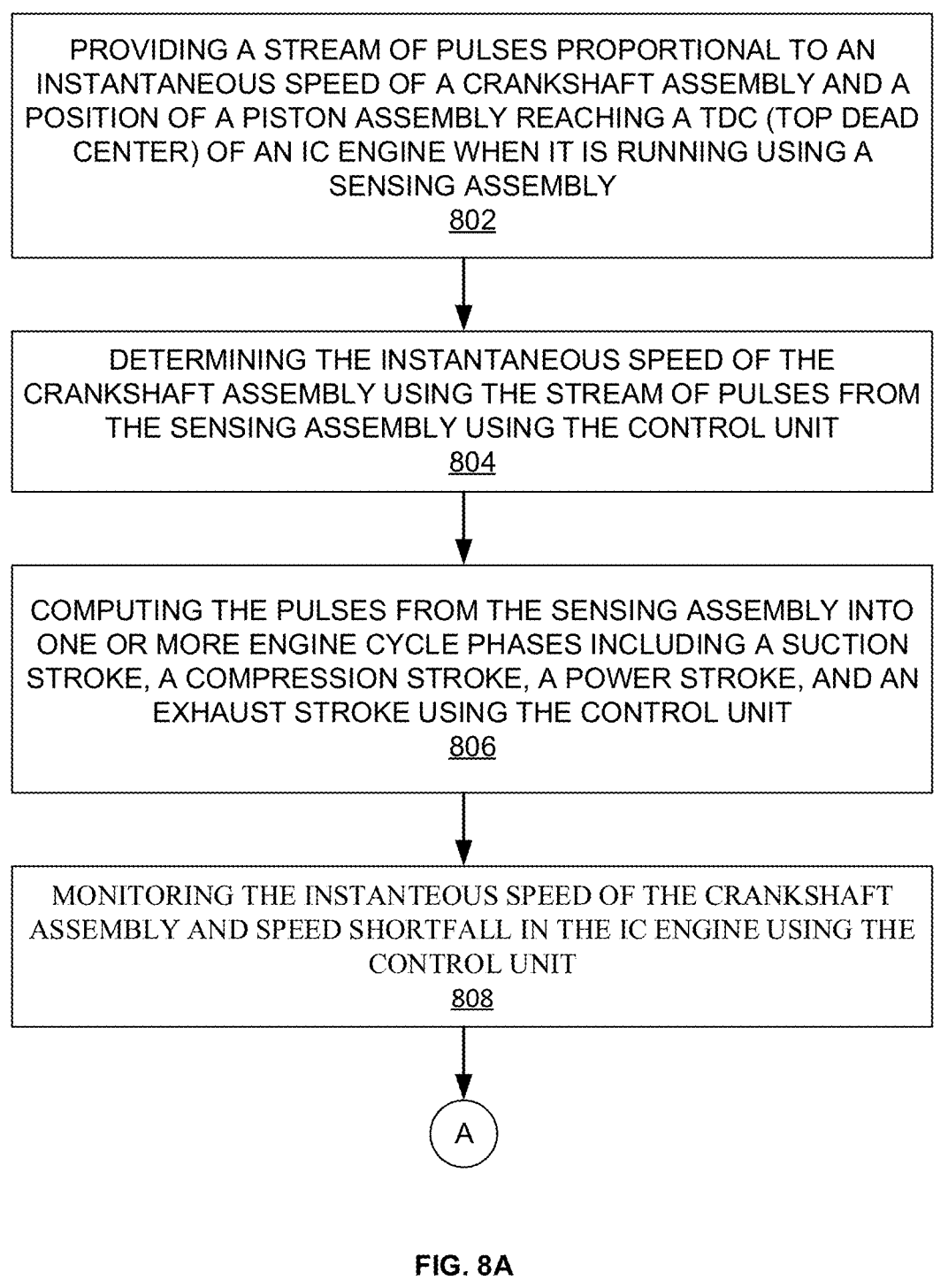

PROVIDING A STREAM OF PULSES PROPORTIONAL TO AN INSTANTANEOUS SPEED OF A CRANKSHAFT ASSEMBLY AND A POSITION OF A PISTON ASSEMBLY REACHING A TDC (TOP DEAD CENTER) OF AN IC ENGINE WHEN IT IS RUNNING USING A SENSING ASSEMBLY
802

DETERMINING THE INSTANTANEOUS SPEED OF THE CRANKSHAFT ASSEMBLY USING THE STREAM OF PULSES FROM THE SENSING ASSEMBLY USING THE CONTROL UNIT
804

COMPUTING THE PULSES FROM THE SENSING ASSEMBLY INTO ONE OR MORE ENGINE CYCLE PHASES INCLUDING A SUCTION STROKE, A COMPRESSION STROKE, A POWER STROKE, AND AN EXHAUST STROKE USING THE CONTROL UNIT
806

MONITORING THE INSTANTEOUS SPEED OF THE CRANKSHAFT ASSEMBLY AND SPEED SHORTFALL IN THE IC ENGINE USING THE CONTROL UNIT
808

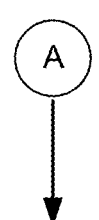

DETECTING THE TARGET VALUE FOR THE TORQUE-ASSIST IS DETERMINED BY ANALYSING THE SPEED SHORTFALL AND THE INSTANTANEOUS SPEED OF THE CRANKSHAFT ASSEMBLY, OR THE POSITION OF PISTON ASSEMBLY BY THE SENSING ASSEMBLY USING THE CONTROL UNIT
810

PROVIDING A TORQUE-ASSIST TO THE ISG BY SWITCHING THE MOSFET BRIDGE TO A MOTORING MODE (M) USING A MOSFET DRIVER TO MAINTAIN AN OPTIMUM TORQUE ASSIST THROUGHOUT THE ONE OR MORE ENGINE CYCLE PHASES USING THE CONTROL UNIT
812

SWITCHING THE ISG TO A GENERATION MODE (G) USING THE MOSFET BRIDGE WHEN THE INSTANTANEOUS SPEED OF THE CRANKSHAFT ASSEMBLY IS GREATER THAN OR EQUAL TO A PREDEFINED THRESHOLD SPEED VALUE OF THE IC ENGINE
814

FIG. 8B

SYSTEM FOR AN INTERNAL COMBUSTION ENGINE WITH AN ELECTRIC TORQUE ASSIST

BACKGROUND

Technical Field

The present subject matter is related to internal combustion (IC) engines in general, and in particular with an implementation of an electric torque assist in the IC engines to provide inertial compensation for reducing mass-based inertial components added to a 2 stroke or 4 strokes IC engines. Furthermore, the disclosed subject matter includes a method for providing electric torque assist to overcome crankshaft speed variation over strokes during engine operation, thereby overcoming a speed variation problem caused by the engine's lower inertia at low and idle speeds.

Description of the Related Art

Conventionally, a 2-stroke or 4-stroke Internal Combustion (IC) engines have only one stroke of two strokes or four strokes, respectively, providing enough power to keep the IC engine running. The two strokes in the 2-stroke engine are referred to as a "compression stroke," when an air-fuel mixture is compressed, and a "power stroke," when an ignited compressed air-fuel mixture provides a large downward force to a piston assembly, providing power to the engine. The power impulse is thus generated during one of the two strokes, and the crankshaft rotates one revolution during the two strokes, with a 180-degree rotation in each stroke. In the 4-stroke engine, there are four strokes including a suction stroke, a compression stroke, a power stroke, and an exhaust stroke, where two strokes make a 360-degree rotation of the crankshaft, and the power stroke provides the power to the engine.

In both types of the engines, the compression stroke energy demand is high in order to compress the air-fuel mixture to a high degree, allowing the mixture to ignite in a subsequent power stroke, with the power stroke beginning at a Top Dead Centre (TDC) and ending at a Bottom Dead Centre (BDC), covering a 180-degree rotation of the crankshaft during this power stroke.

To ensure that the subsequent compression stroke can compress the air-fuel mixture, every internal combustion (IC) engine has an intertrial block made an integral part of the crankshaft or provided as a flywheel component attached to the crankshaft so that the energy needs of the compression stroke are met from the stored energy of the inertial block, with the energy of the inertial block augmented during the power stroke by the ignition of the air-fuel mixture. Any reduction in inertial block mass results in a large speed swing during the compression stroke, with this swing being more pronounced at low and idling speeds of the internal combustion (IC) engine.

For instance, FIG. 1 illustrates an exemplary schematic view of an Internal Combustion (IC) engine assembly with an Integrated Starter Generator (ISG) 115 connected to a crankshaft and an inertial mass provision made as part of the crankshaft for speed optimization in conventional internal combustion (IC) engine according to the prior art. The Internal Combustion (IC) engine with the integrated starter generator (ISG) 115 is mounted on the crankshaft. The conventional system includes, in general, an internal combustion (IC) engine assembly 100 including a piston assembly 112 including a fuel-air mixture into a confined space 114 for ignition at a Top Dead Centre (TDC) position 125 during the upward stroke (i.e the compression stroke). A crankshaft assembly 105, which includes a necessary inertial mass attached for maintaining necessary rotational in the conventional internal combustion (IC) engine, is coupled to the integrated starter generator (ISG) 115 mounted on the crankshaft as illustrated in a shaft representation 116. The piston assembly 112 moves with every stroke between the Top Dead Centre (TDC) 125 and the Bottom Dead Centre (BDC) 120, and two such reciprocating strokes make one 360-degree rotational revolution of the crankshaft assembly 105. With the integrated starter generator (ISG) 115 connected to the crankshaft assembly 105, the integrated starter generator (ISG) 115 also makes one revolution during one revolution of the crankshaft assembly 105.

Therefore, there is a need to address the aforementioned technical draw backs and problems in a speed variation problem associated with the engine's lower inertia at low and idle speed operation of the engine.

SUMMARY

In view of the foregoing, an embodiment of the present invention provides a configuration in which the above problem of crankshaft speed variation due to reduced inertial mass is overcome by using an Integrated Starter Generator (ISG), specifically in the motoring mode (M) with electric torque assist during the appropriate stroke, thus meeting the speed shortfall in the crankshaft speed throughout the appropriate stroke of both 2-stroke and 4-stroke engines, during idling and low-speed operation. With lower inertial mass and overall engine weight, it is thus feasible to provide speed variation regulation at low and idling speeds. Furthermore, this allows the engine to run on a lean fuel-air mixture, which improves emissions at low and idling speeds.

In an aspect, a system for an internal combustion (IC) engine with an electric torque assist is provided. The system includes a crankshaft assembly of the IC engine, a piston assembly, an integrated starter generator (ISG), a sensing assembly, a MOSFET bridge, a MOSFET driver, a battery and a pulsar coil, and a control unit. The piston assembly is connected with the crankshaft assembly of the IC engine. The integrated starter generator is connected to a side of the crankshaft assembly of the IC engine using a shaft. The ISG operates in any of a motoring mode (M) or a generation mode (G). The sensing assembly is mounted internally or externally between the crankshaft assembly and the ISG of the IC engine. The sensing assembly provides a stream of pulses proportional to an instantaneous speed of the crankshaft assembly and generates pulses with respect to the position of the piston assembly. The MOSFET bridge is connected to the ISG. The MOSFET bridge enables the motoring mode (M) or the generation mode (G) of the ISG. The MOSFET driver is connected to the MOSFET bridge and is configured to switch operations of the MOSFET bridge during electric torque assist to the motoring mode (M) or the generation mode (G). The control unit includes a controller or a processor that is configured to determine the instantaneous speed of the crankshaft assembly using the stream of pulses from the sensing assembly, compute the pulses from the sensing assembly into one or more engine cycle phases, monitor the instantaneous speed of the crankshaft assembly and speed shortfall in the IC engine, determine a target value for the electric torque assist by analysing the speed shortfall and the instantaneous speed of the crankshaft assmly, or detecting the position of piston assembly by the sensing assembly, when the instantaneous speed of the crankshaft assembly is less than a predefined threshold speed value of the IC engine, and provide the electric torque assist to the ISG by switching the MOSFET bridge to the motoring mode (M) of the ISG using the MOSFET driver to maintain an optimum electric torque assit throughout the one or more engine cycle phases.

In some embodiments, the IC engine comprises a 2-stroke engine or a 4-stroke engine.

In some embodiments, the controller or the processor is configured to switch the MOSFET bridge to the generation mode (G) of the ISG when the instanteous speed of the crankshaft assembly is greater or equal to the predefined threshold speed value of the IC engine.

In some embodiments, the one or more engine cycle phases for the 4 stroke engine includes a suction stroke, a compression stroke, a power stroke, and an exhaust stroke. The one or more engine cycles phases for the 2 stroke engine includes a suction/compression stroke and a power/exhaust stroke.

In some embodiments, the sensing assembly is mounted externally to the ISG of the IC engine to include one or more sensors. The one or more sensors include magnetic pick-up coils, Hall-effect sensors, magneto-resistive element (MRE) sensors, and optical sensors.

In some embodiments, the sensing assembly is mounted internally to the ISG of the IC engine to determine the stream of pulses. The stream of pulses can be detected with the control unit using any of back EMF measurement, zero-crossing detection or current sensing.

In some embodiments, the one or more engine cycle phases can be detected using the pulsar coil.

In as aspect, an embodiment herein provides a method for an internal combustion (IC) engine with electric torque assist. The method includes providing a stream of pulses proportional to an instantaneous speed of a crankshaft assembly and a position of a piston assembly reaching a Top Dead Center (TDC) of the IC engine when it is running using a sensing assembly. The method includes determining the instantaneous speed of the crankshaft assembly using the stream of pulses from the sensing assembly using a control unit. The method includes computing the pulses from the sensing assembly into one or more engine cycle phases including a suction stroke, a compression stroke, a power stroke, and an exhaust stroke, using the control unit. The method includes monitoring the instantaneous speed of the crankshaft assembly and speed shortfall in the IC engine using the control unit. The method includes determining a target value for the electric torque assist by analysing the speed shortfall and the instantaneous speed of the crankshaft assembly or detecting the position of piston assembly by the sensing assembly, when the instantaneous speed of the crankshaft assembly is less than a pre-defined threshold speed value of the IC engine, using the control unit. The method includes providing the torque-assist to an ISG by switching a MOSFET bridge to a motoring mode (M) of the ISG using a MOSFET driver to maintain an optimum torque-assist throughout the one or more engine cycle phases using the control unit. The method includes switching the ISG in a generation mode (M) using the MOSFET bridge when the instanteous speed of the crankshaft assembly is greater or equal to the predefined threshold speed value of the IC engine.

The electric torque, which compensates for the lower inertia of the engine mechanical components, leads to enhanced emission control of the IC engine. Engines define a driving cycle that begins with the engine idling by default. The engine will be cool at this point, and frictional forces will be relatively high. To overcome frictional forces and keep the engine running without shutting it down, extra fuel is fed into the engine to increase power, which makes the air-fuel mixture rich, which increases emissions. Closed-loop control of the air-fuel mixture is disabled during this time. Closed-loop control is enabled only when the engine temperature reaches a certain threshold or other vehicle requirements are met. This means that in a conventional system, emissions are intentionally higher at the start until closed-loop stoichiometric ratio control is implemented. This limitation is overcomed by this system with the electric torque-assist.

The present invention emphasizes the necessity of employing an integrated starter generator (ISG) for electric torque assistance on specific strokes of a 2-stroke or 4-stroke Internal Combustion (IC) engine with reduced inertial mass for speed optimization at low and idle speeds.

With reference to the following description, these and other aspects of the current subject matter will be better understood. This summary is provided to introduce a selection of concepts in a simplified form, in accordance with one embodiment of the present subject matter. This summary is not intended to identify key features or essential features of the claimed subject matter, nor is it intended to be used to limit the claimed subject matter's scope.

BRIEF DESCRIPTION OF THE DRAWINGS

The features, aspects, and advantages of the present subject matter will be better understood with regard to the following description, and accompanying figures. The use of the same reference number in different figures indicates similar or identical features and components.

FIGS. 8A and 8B are flow diagrams that illustrates a method for employing the Integrated Starter Generator (ISG) for electric torque assistance in the Internal Combustion (IC) engine according to some embodiments herein.

DETAILED DESCRIPTION

Figure 1:
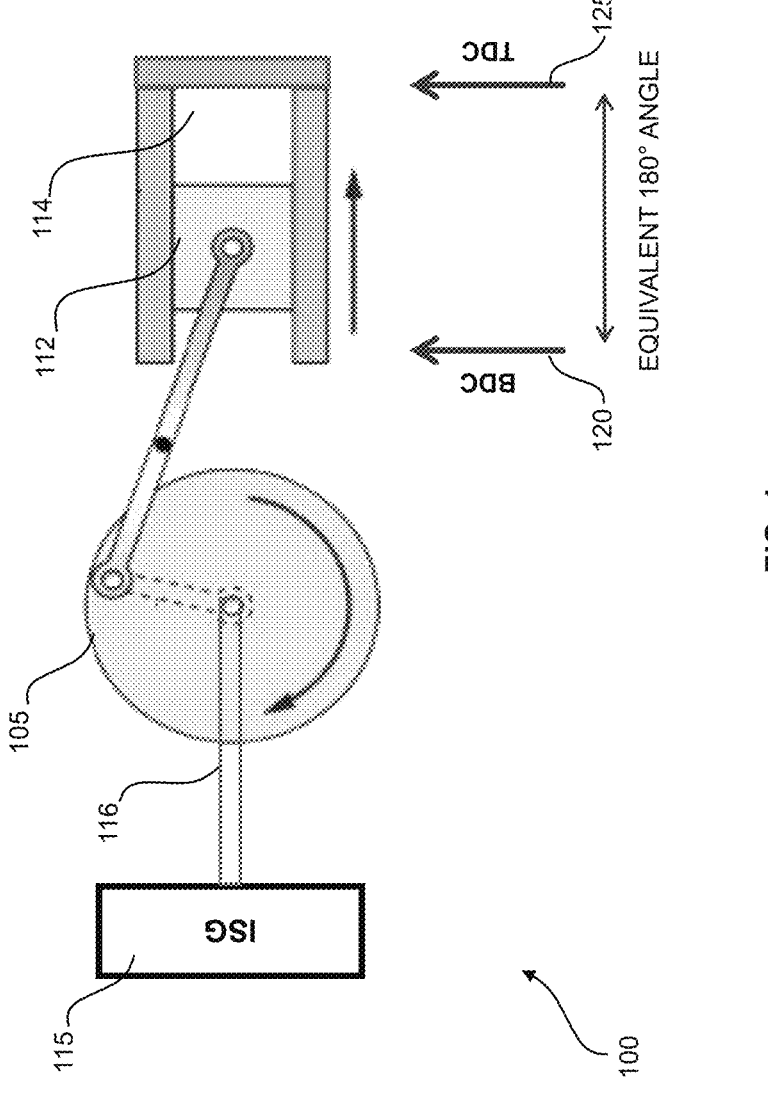
FIG. 1 illustrates an exemplary schematic view of an Internal Combustion (IC) engine with an Integrated Starter Generator (ISG) connected to a crankshaft and an inertial mass provision made as part of the crankshaft for speed optimization in a conventional Internal Combustion (IC) engine according to the prior art.

The embodiments described herein, and their various features and advantageous details, are explained in considerable detail with reference to the non-limiting embodiments illustrated in the accompanying drawings and detailed in the following description. Descriptions of well-known components and processing techniques are omitted to avoid obscuring the embodiments described herein. The examples provided herein are provided solely to facilitate an understanding of how the embodiments described herein may be practiced and to further enable those skilled in the art to practice the embodiments described herein. As a consequence, the examples should not be interpreted as limiting the scope of the embodiments described herein.

As aforementioned, there is a need for an approach that employs an Integrated Starter Generator (ISG) for electric torque assistance on specific strokes of a 2-stroke or 4-stroke Internal Combustion (IC) engine with reduced inertial mass for speed optimization, thereby overcoming a speed variation problem caused by the engine's lower inertia at low and idle speeds. Referring now to the drawings, and more particularly to FIGS. 2 through 8, where similar reference characters consistently represent corresponding aspects throughout the figures, preferred embodiments are illustrated.

Figure 2:
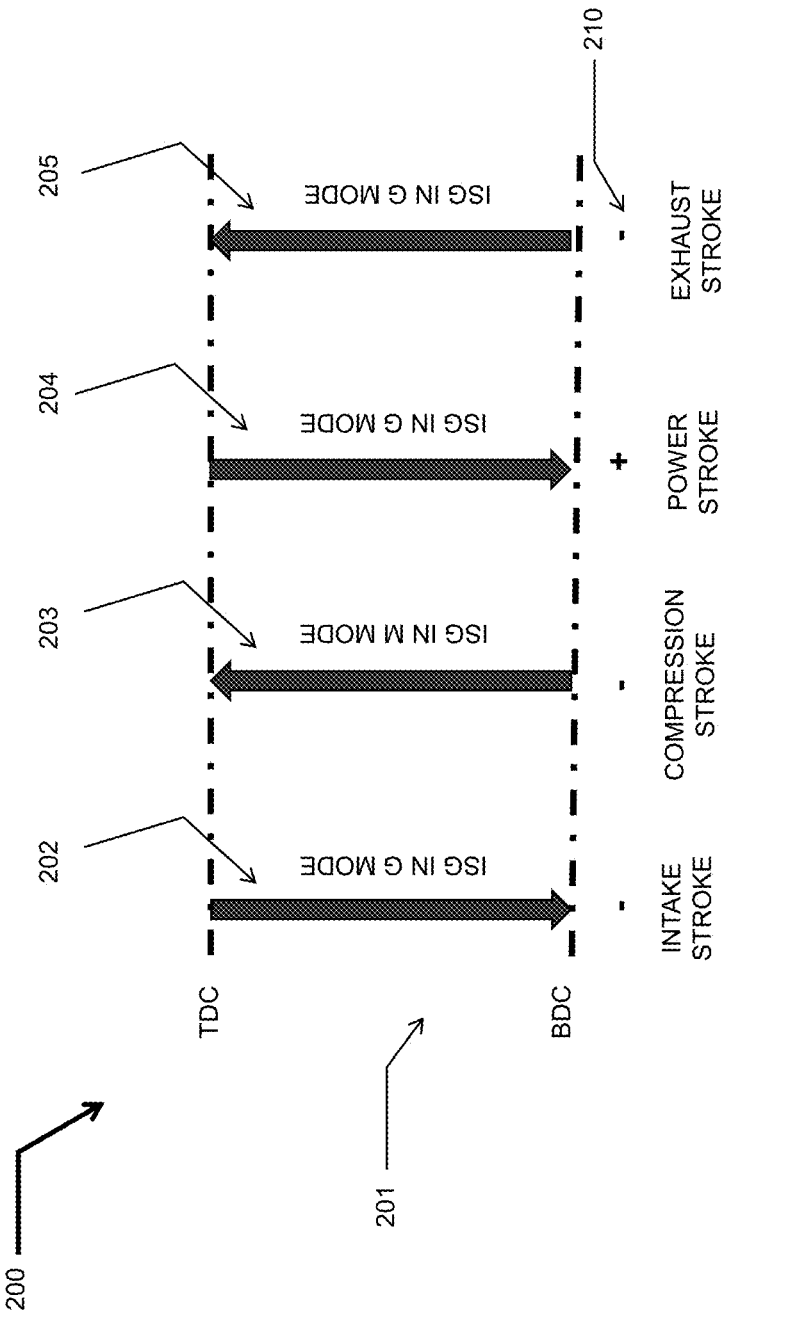
FIG. 2 illustrates a schematic diagram of four strokes of a 4-stroke Internal Combustion (IC) engine and energy needs of each stroke according to some embodiments herein.

FIG. 2 illustrates a schematic diagram of four strokes of a 4-stroke Internal Combustion (IC) engine and energy needs of each stroke according to some embodiments herein. The energy needs of each stroke are included with positive and negative markings during each stroke, where a positive sign indicates energy added to a rotational mass and a negative sign indicates implying energy used from the rotational mass as the Internal Combustion (IC) engine rotates. A four-stroke engine with the four-stroke Internal Combustion (IC) engine takes a representative form. A piston movement 201 is between a Top Dead Centre (TDC) and a Bottom Dead Centre (BDC) during each of the strokes. An intake stroke or a suction stroke 202 does not provide power to the Internal Combustion (IC) engine. On the contrary, this movement uses the inertial energy of the rotating crankshaft assembly. During this stroke, the energy use 210 is a negative sign, signifying this inertial use. During the compression stroke 203, the inertial energy of the crankshaft assembly is used, and this use are larger than the use in the suction stroke 202 as the air-fuel mixture is under compression in the Top Dead Centre (TDC) space. In some embodiments, the Top Dead Centre (TDC) is a confined space. An electric torque assistance is provided to the Internal Combustion (IC) engine during the compression stroke 203, that allows reduction of a mass of rotational inertial parts provided in the Internal Combustion (IC) engine and making up for this with the electric torque assist.

During the next stroke i.e. a power stroke 204, the fuel-air ignition provides energy to the crankshaft assembly, as illustrated by the positive sign in the energy sign representation 210. The final stroke is an exhaust stroke 205, where the crankshaft assembly uses the inertial energy to scavenge the products of ignition in the power stroke 204. In some embodiments, the exhaust stroke 205 uses the inertial energy of the crankshaft assembly. The integrated starter generator (ISG) is moved to a motoring mode (M) and electric torque assist is provided to the crankshaft assembly in the compression stroke 203, and the integrated starter generator (ISG) is moved back to a generation mode (G) during the three remaining strokes: the suction stroke 202, the power stroke 204, and the exhaust stroke 205, to charge a battery system. In some embodiments, as the integrated starter generator (ISG) is rapidly switched between the motoring mode (M) and the generation mode (G), it enables a feasibility of preferentially using the electric torque assist mode during any of the two other strokes i.e. the suction stroke 202 and the exhaust stroke 205. These two strokes are net inertial energy consumers from the crankshaft assembly. The use of the two different modes, namely the motoring mode (M) and the generation mode (G) of the Integrated Starter Generator (ISG), is switched during the beginning of the stroke and the end of the stroke as located by the Top Dead Centre (TDC) position and the Bottom Dead Centre (BDC) position.

Figure 3:
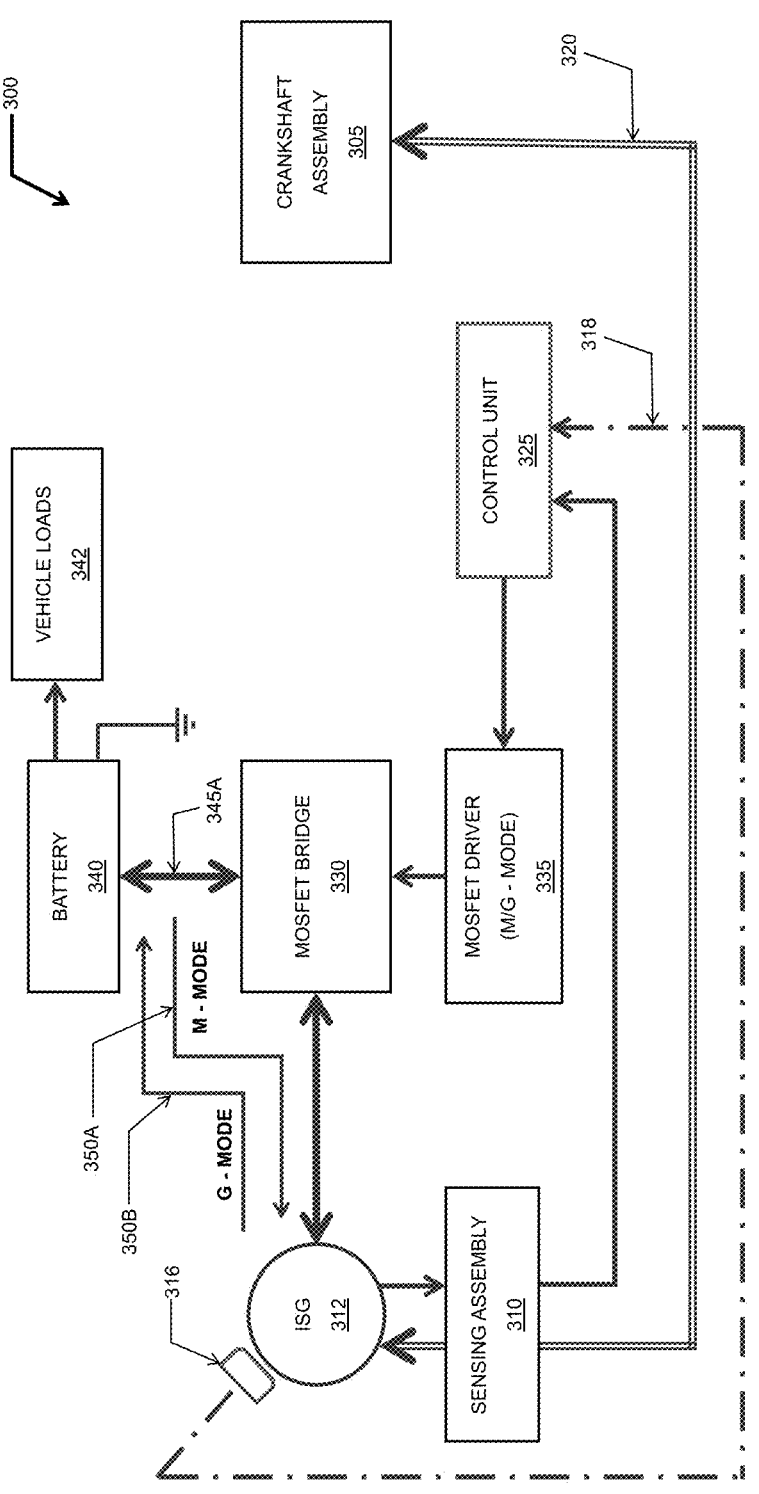
FIG. 3 illustrates a block diagram of a system for an internal combustion (IC) engine for controlling an Integrated Starter Generator (ISG) with an electric torque assist according to some embodiments herein.

FIG. 3 illustrates a block diagram of a system 300 for an internal combustion (IC) engine for controlling an Integrated Starter Generator (ISG) 312 with an electric torque assist according to some embodiments herein. The system 300 for the internal combustion (IC) engine with electric torque assist includes a crankshaft assembly 305, a piston assembly, the ISG 312, a sensing assembly 310, a MOSFET bridge 330, a MOSFET driver 335, a battery 340) and a pulsar coil 316, and a control unit 325. The crankshaft assembly 305 of the IC engine is the assembly with reduced inertial mass. The IC engine may be any of a 2-stroke engine or a 4-stroke engine. The piston assembly (not shown in FIG. 3) is connected with the crankshaft assembly 305 of the IC engine. The integrated starter generator (ISG) 312 is connected to a side of the crankshaft assembly 305 of the IC engine using a shaft 320. The ISG is configured to operate in any of a motoring mode (M) or a generation mode (G). The sensing assembly 310 is mounted internally or externally between the crankshaft assembly 305 and the ISG 312 of the IC engine. The sensing assembly is configured to provide a stream of pulses proportional to an instantaneous speed of the crankshaft assembly 305 and generate pulses with respect to the position of the piston assembly. The sensing assembly 310 may be mounted externally to the ISG 312 of the IC engine to include one or more sensors. In some embodiments, the one or more sensors include magnetic pick-up coils, Hall-effect sensors, magneto-resistive element (MRE) sensors, optical sensors, and the like. The sensing assembly 310 may be mounted internally to the ISG 312 of the IC engine to determine the stream of pulses. In some embodiments, the stream of pulses can be detected with control unit 325 using any of back EMF measurement, zero-crossing detection, or current sensing, and the like.

The MOSFET bridge 330 is connected to the ISG 312 and enables the motoring mode (M) or the generation mode (G) of the ISG 312. The MOSFET driver 335 is connected to the MOSFET bridge 330 and is configured to switch operations of the MOSFET bridge 330 during torque-assist to the motoring mode (M) or the generation mode (G). The control unit 325 includes a controller or a processor that is configured to (i) determine the instantaneous speed of the crankshaft assembly 305 using the stream of pulses from the sensing assembly 310, (ii) compute the pulses from the sensing assembly 310 into one or more engine cycle phases, (iii) monitor the instantaneous speed of the crankshaft assembly 305 and speed shortfall in the IC engine, (iv) determine a target value for the torque-assist by analyzing the speed shortfall and the instantaneous speed of the crankshaft assembly 305 or detect the position of piston assembly by the sensing assembly 310, when the instantaneous speed of the crankshaft assembly 305 is less than a predefined threshold speed value fo the IC engine, and (v)

provide the electric torque assist to the ISG 312 by switching the MOSFET bridge 330 to the motoring mode (M) of the ISG 312 using the MOSFET driver 335 to maintain an optimum torque-assist throughout the one or more engine cycle phases. The one or more engine cycle phases for the 4-stroke engine may include a suction stroke, a compression stroke, a power stroke, and an exhaust stroke. The one or more engine cycle phases for the 2-stroke engine may include a suction/compression stroke and a power/exhaust stroke. The one or more engine cycle phases may be detected using the pulsar coil 316.

In some embodiments, the controller or the processor is configured to switch the MOSFET bridge 330 to the generation mode (G) of the ISG 312, when the instantaneous speed of the crankshaft assembly 305 is greater than or equal to the predefined threshold speed value of the IC engine. In some embodiments, the controller or the processor is configured to monitor energy consumption and state of charge (SOC) of the battery 340) when the ISG 312 is in the motoring mode (M).

The sensing assembly 310 resolves the position of the crank with respect to the Top Dead Centre (TDC) and the Bottom Dead Centre (BDC) and enables the control unit 325 to switch the operations of the MOSFET bridge 330 to the motoring mode (M) or the generation mode (G). The MOS-FET bridge 330 is typically 3 half-bridges, as in the case of a three-phase integrated starter generator (ISG). The MOS-FET bridge 330 through the MOSFET driver 335 ensures a dual-direction energy flow between the ISG 312 and the battery 340, where the battery 340 is enclosed with a vehicle-mounted battery system. The MOSFET is connected using power cables and a protective scheme 345a on top of the vehicle-mounted battery system and a similar arrangement 345b between the ISG 312 and the MOSFET bridge 330. During the electric torque assist (M mode in MOSFET driver 335), the energy flow 350a is from the vehicle-mounted battery system to the ISG 312, and in the generation mode (G) in the MOSFET driver 335, the energy flow 350b is between the integrated starter generator (ISG) 312 and the vehicle-mounted battery system.

The sensing assembly 310 may provide a data that is fed as input to the control unit 325 to detect angles of the piston assembly, count the strokes and identify the four strokes of the 4-stroke engine, or alternatively, the two strokes of the 2-stroke internal combustion (IC) engine.

Figure 4:
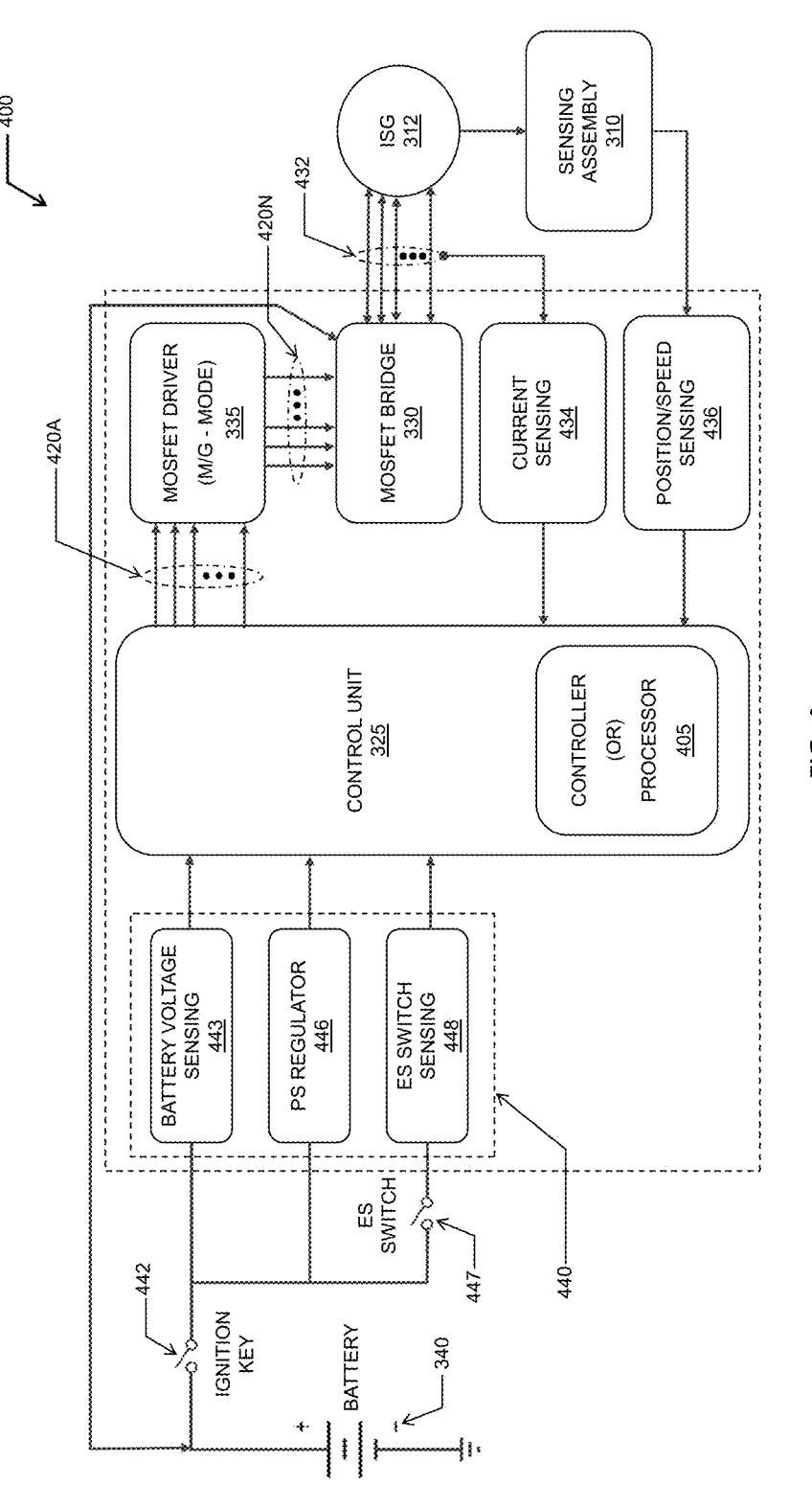
FIG. 4 illustrates a system view of a control unit for enabling crankshaft position sensing and motor engagement according to some embodiments herein.

FIG. 4 illustrates a system view 400 of the control unit 325 for enabling crankshaft position sensing and motor engagement according to some embodiments herein. The control unit 325 includes a controller or a processor 405. The control unit 325 identifies the crankshaft assembly 305 position and the stroke number (identify if it is the suction stroke, the compression stroke, the power stroke, or the exhaust stroke) and, based on conditions of the battery 340, the control unit 325 switches the Integrated Starter Generator (ISG) 312 to control the MOSFET bridge 330 through interfaces 420A, 420N of MOSFET drivers 330 to provide the torque-assist during the compression stroke. The sensing assembly 310 provides the positional reference of the Top Dead Centre (TDC) and Bottom Dead Centre (BDC) as well as the crank angle.

In some embodiments, the sensing assembly 310 derives a pulse stream during crankshaft rotation, enabling the control unit 325 to determine the rotational angle at any instance of the crankshaft assembly 305.

The controller or processor 405 in the control unit 325 implements the electric torque assist, preferably in the compression stroke, and switch the Integrated Starter Generator (ISG) 312 to the generation mode (G) during the remaining three strokes. The control unit 325 may determine a decision to switch the ISG 312 to the motoring mode (M) or the generation mode (M) during the one or more engine cycle phases. When an ignition key switch 442 is enabled, an Intergated Starter Generator (ISG) controller powered up by a power supply regulator and a battery voltage sensing circuit 443 provide information about battery voltage to the controller or processor 405 for optimum use of battery energy during the motoring mode (M) in the process of switching on electric torque assist and monitoring voltage. The torque-assist is enabled, for example, on engine RPM, and temperature. Electric torque assist duration is a variable parameter that is decided by the controller or processor 405 in the control unit 325.

The threshold setting for the electric torque assist may be governed by an inertial component that supports a basic level of rotational inertial energy. The inertial energy available is equated as a product of the inertial mass and the square of the rotational velocity. As the speed of the engine increases, the inertial energy moves upwards as the square of the product of the engine speed, and the need for electric torque assist disappears, and the controller or processor 405 enables the generation (G) mode.

In some embodiments, the system view 400 implements the electric torque assist to compensate the lower inertia in the IC engine. A collection of interface elements 440) monitors the battery voltage through the battery voltage sensing 443 circuit. The power supply regulator powers the control unit 325 and the ignition starts to switch to turn on the vehicle. A wiring connection 432 connects the MOSFET bridge 330 and the Integrated Starter Generator (ISG) 312 that carries power during the generation (G) mode and the motoring mode (M) of the Integrated Starter Generator (ISG) 312.

Figure 5:
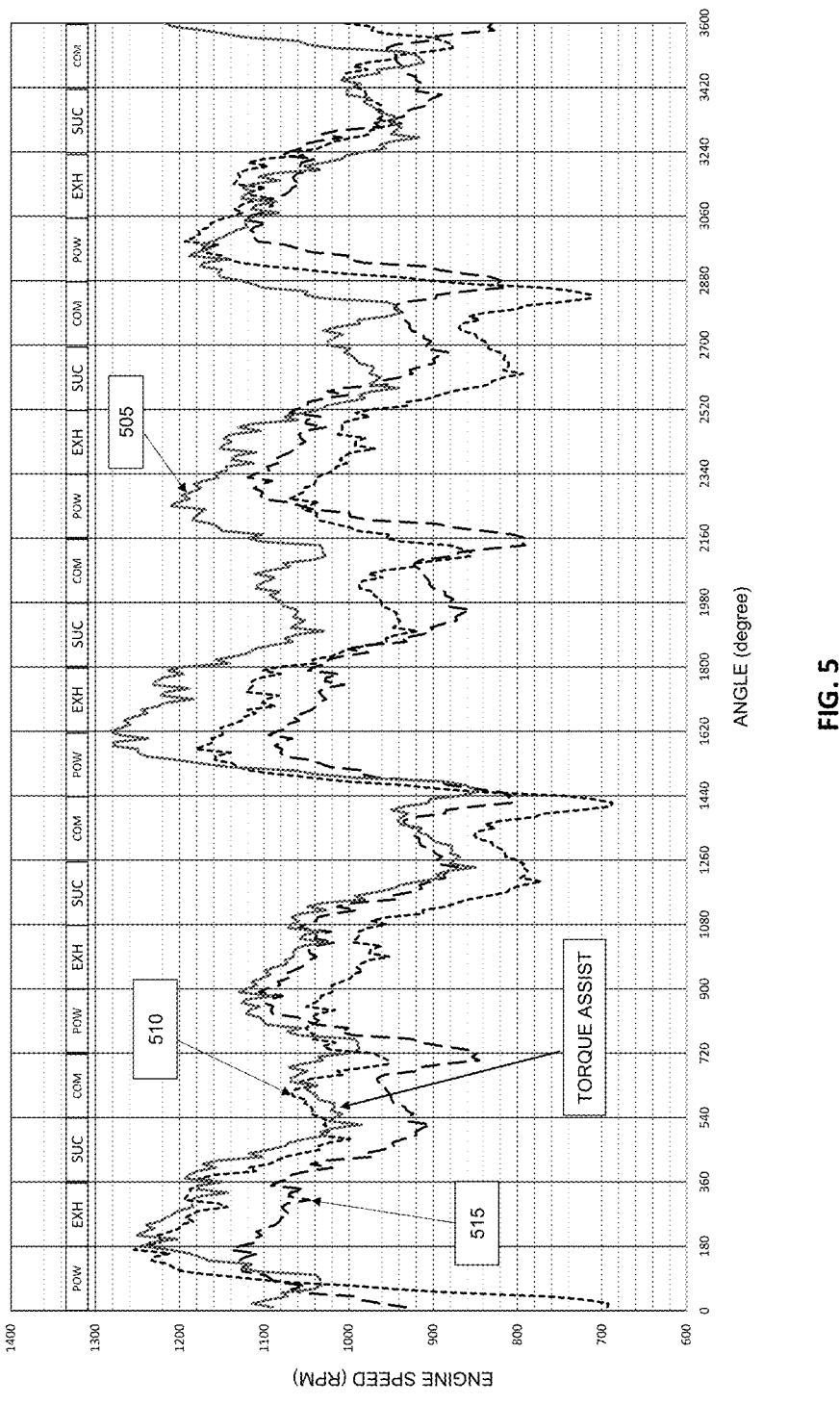
FIG. 5 illustrates a graphical representation of improved speed variation during a compression stroke with a reduced inertial component in the Internal Combustion (IC) engine according to some embodiments herein.

FIG. 5 illustrates a graphical representation of improved speed variation during a compression stroke with a reduced inertial component in the Internal Combustion (IC) engine according to some embodiments herein. The graphical representation includes degrees in an X-axis and engine speed in rpm in a Y-axis. The graphical representation tracks the speed of the crankshaft during 10 continuous revolutions (i.e. 20 strokes) and five compression and five power strokes in this period for a 4-stroke engine. Plot 515 is a plot for a conventional 4-stroke engine with the normal inertial mass and a regular rich mixture (air to fuel ratio at idling being 14.7) burned in the starting and idling crankshaft speed of near 900 rpm. Plot 510 shows the engine performance with reduced inertia, and it is evident that the average speed drops and the plot 510 are well below the plot 515. The average rpm has dropped by nearly 100 rpm. As well as the peak to valley shift in the instantaneous speed, with speed dropping from 1200 rpm after the power stroke to 700 rpm as the piston hits the Top Dead Centre (TDC) at the end of the compression stroke, the compression stroke having used a large part of the stored inertial energy is essentially much lower due to the reduced inertial mass. The trace with the assist allows the engine to operate with an air-to-fuel ratio (AFR) of near 13 instead of 14.7, thereby improving emissions.

A trace 505 shows a performance with the electric torque assist. The trace 505 pulls the curve back from its position in the plot 515 to the plot 510, clearly demonstrating a benefit of the electric torque assist in compensating for the reduced inertia during the compression stroke. The electric torque assist optimizes the speed between the peak speed at the end of the compression stroke when the Bottom Dead Centre (BDC) is reached and the valley of the lowest speed when the Top Dead Centre (TDC) is reached at the end of the compression stroke with the electric torque assist.

Figure 6:
FIG. 6. illustrates a switching sequence of the Integrated Starter Generator (ISG) to a motoring mode (M) when the compression stroke is identified and a current shifting in the Integrated Starter Generator (ISG) due to a mode change from a generation mode (G) to the motoring mode (M) according to some embodiments herein.
Figure 6:
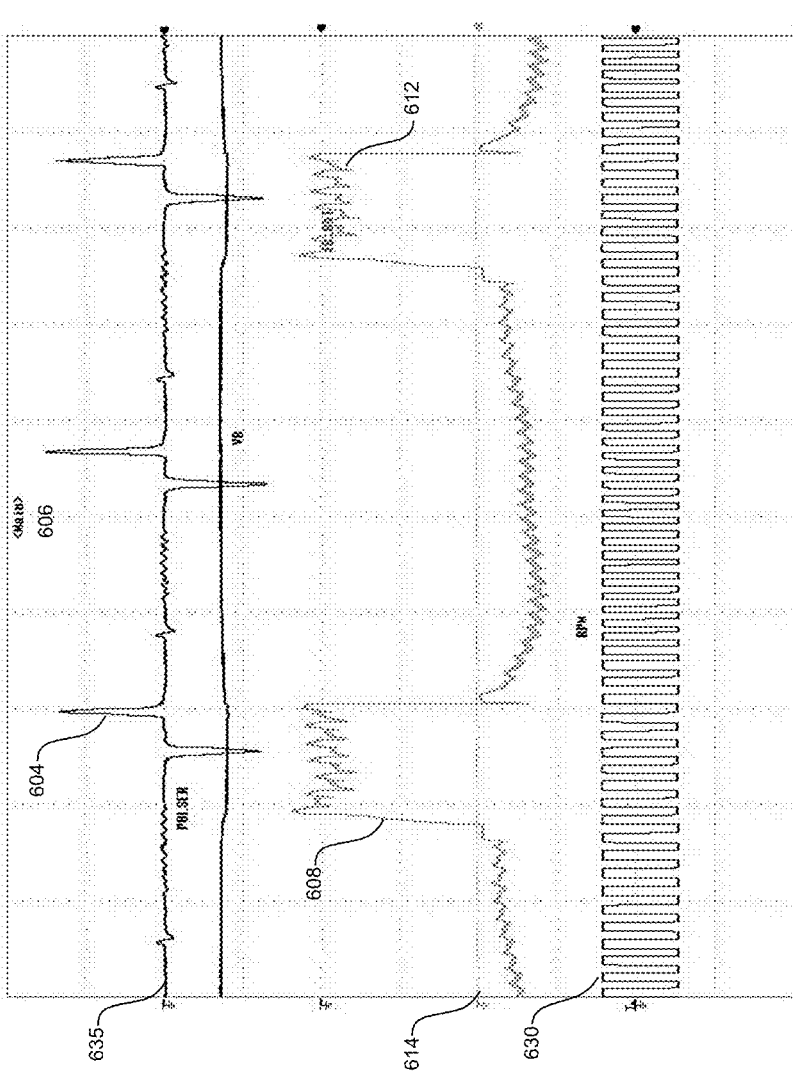

FIG. 6 illustrates a switching sequence of the Integrated Starter Generator (ISG) 312 to the motoring mode (M) when the compression stroke is identified and a current shifting in the Integrated Starter Generator (ISG) 312 due to a mode change from the generation (G) mode to the motoring mode (M) according to some embodiments herein. The current switching sequence 600 of the Integrated Starter Generator (ISG) 312 during the torque-assist phase is shown. The fundamental timing clock component to identify the compression stroke, the Top Dead Centre (TDC) and the Bottom Dead Centre (BDC) determination is from a pulse stream 630. A derivative of this pulse stream is a trace of the Top Dead Centre (TDC) repeating a crank sensor pulse 635 during the end of the compression stroke and the exhaust stroke. The switch over of the Integrated Starter Generator (ISG) to the electric torque assist is at an instance of 615 when the Bottom Dead Centre (BDC) hits prior to the beginning of the compression stroke. The reversal of the electric torque assist is achieved when the Top Dead Centre (TDC) hits prior to the ignition 620 of the termination of the compression stroke. The magnitude of the torque-assist compensates for the drop in crankshaft speed due to the lower inertia illustrated by the plateau of a current trace 610.

Figure 7:
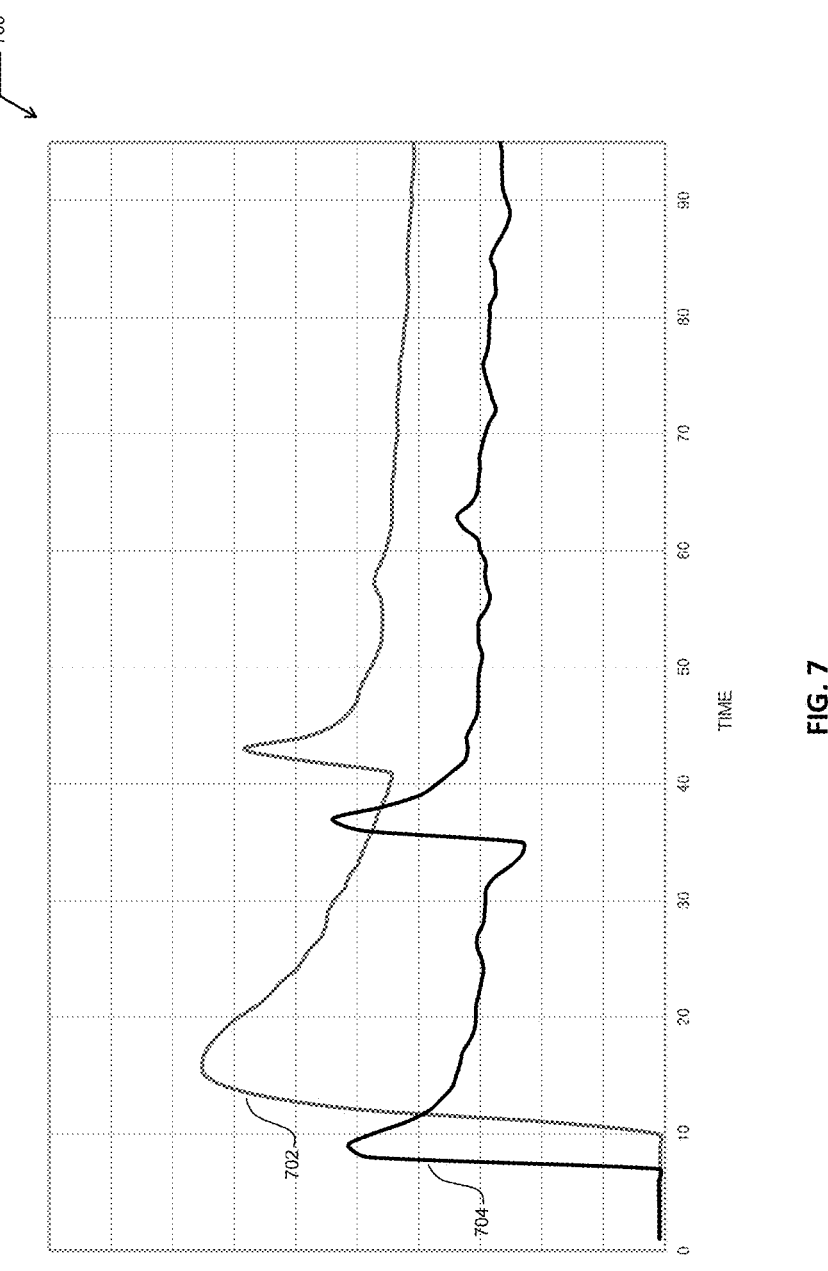
FIG. 7 illustrates a graphical representation of enhanced emission control of the IC engine with and without electric torque assistance of FIG. 3 according to some embodiments herein.

FIG. 7 illustrates a graphical representation of enhanced emission control of the IC engine with and without the electric torque assistance of FIG. 3 according to some embodiments herein. A trace 702 depicts a performance of the IC engine with the conventional inertial mass loaded without the electric torque assist during this period, that clearly shows that the total hydrocarbon (THC) emitted by the IC engine is high in relation to time and speed. A trace 704 depicts a performance of the IC engine with the electric torque assist that has less inertial mass than a conventional inertial mass-loaded IC engine, while the THC emitted by the IC engine is reduced when compared to the IC engine without the electric torque assist throughout this period.

FIGS. 8A and 8B are flow diagrams that illustrates a method for employing the Integrated Starter Generator (ISG) 312 for electric torque assistance in the Internal Combustion (IC) engine according to some embodiments herein. At a step 802 a stream of pulses proportional to the instantaneous speed of the crankshaft assembly 305 and the position of the piston assembly reaching a TDC (top dead center) of the IC engine when it is running is provided using the sensing assembly 310. At a step 804, the instantaneous speed of the crankshaft assembly 305 is determined using the stream of pulses from the sensing assembly 310 using the control unit 325. At a step 806, the pulses from the sensing assembly 310 are computed into one or more engine cycle phases including the suction stroke, the compression stroke, the power stroke, and the exhaust stroke using the control unit 325. At a step 808, the instanteous speed of the crankshaft assembly 305 and speed shortfall in the IC engine is monitored using the control unit 325. At a step 810, the target value for the torque-assist is determined by analysing the speed shortfall and the instantaneous speed of the crankshaft assembly 305, or the position of piston assembly is detected by the sensing assembly 310, using the control unit 325.

At a step 812, the torque-assist is provided to the ISG 312 by switching the MOSFET bridge 330 to the motoring mode (M) using the MOSFET driver 335 to maintain the optimum electric torque assist throughout the one or more engine cycle phases using the control unit 325. At a step 814, the ISG 312 is switched to the generation mode (G) using the MOSFET bridge 330 when the instantaneous speed of the crankshaft assembly 305 is greater than or equal to the predefined threshold speed value of the IC engine.

The aforementioned description of the specific embodiments will sufficiently reveal the various aspects of the embodiments herein that others can readily modify and/or adapt such specific embodiments for various applications using current knowledge, and thus such adaptations and modifications should and are intended to be understood within the meaning and range of equivalents of the disclosed embodiments. It should be understood that the phraseology or terminology used herein is intended to describe rather than limit. While the embodiments herein have been described in terms of preferred embodiments, those skilled in the art will recognize that the embodiments can be modified within the spirit and scope of the appended claims.

We claim:

1. A system (300) for an internal combustion (IC) engine with an electric torque assist, wherein the system (300) comprises:

a crankshaft assembly (305) of the IC engine;

a piston assembly that is connected with the crankshaft assembly (305) of the IC engine;

characterized in that, an integrated starter generator (ISG) (312) that is connected to a side of the crankshaft assembly (305) of the IC engine using a shaft (320), wherein the ISG (312) operates in any of a motoring mode (M) or a generation mode (G);

one or more sensors (310) that are mounted internally or externally between the crankshaft assembly (305) and the ISG (312) of the IC engine, wherein the one or more sensors (310) provides a stream of pulses proportional to an instantaneous speed of the crankshaft assembly (305) and generates pulses with respect to the position of the piston assembly;

a MOSFET bridge (330) that is connected to the ISG (312), wherein the MOSFET bridge (330) enables the motoring mode (M) or the generation mode (G) of the ISG (312);

a MOSFET driver (335) that is connected to the MOSFET bridge (330), wherein the MOSFET driver (335) is configured to switch operations of the MOSFET bridge (330) during the electric torque assist to the motoring mode (M) or the generation mode (G);

a battery (340) and a pulsar coil (316); and a control unit (325) comprising:

a controller or a processor (405) that is configured to:

determine the instantaneous speed of the crankshaft assembly (305) using the stream of pulses from the one or more sensors (310);

compute the pulses from the one or more sensors (310) into one or more engine cycle phases;

monitor the instantaneous speed of the crankshaft assembly (305) and speed shortfall in the IC engine;

determine a target value for the electric torque assist by analysing the speed shortfall and the instantaneous speed of the crankshaft assembly (305), or detecting the position of piston assembly by the one or more sensors (310), when the instantaneous speed of the crankshaft assembly (305) is less than a predefined threshold speed value of the IC engine; and provide the electric torque assist to the ISG (312) by switching the MOSFET bridge (330) to the motoring mode (M) of the ISG (312) using the MOS-FET driver (335) to maintain an optimum electric torque assist throughout the one or more engine cycle phases.

2. The system (300) of claim 1, wherein the IC engine comprises a 2-stroke engine or a 4-stroke engine.

3. The system (300) of claim 1, wherein the controller or the processor (405) is configured to switch the MOSFET bridge (330) to the generation mode (G) of the ISG (312) when the instantaneous speed of the crankshaft assembly (305) is greater than or equal to the predefined threshold speed value of the IC engine.

4. The system (300) of claim 2, wherein the one or more engine cycle phases for the 4-stroke engine comprises a suction stroke, a compression stroke, a power stroke, and an exhaust stroke, wherein the one or more engine cycle phases for the 2-stroke engine comprises a suction/compression stroke and a power/exhaust stroke.

5. The system (300) of claim 1, wherein the one or more sensors (310) is mounted externally to the ISG (312) of the IC engine to include one or more sensors, wherein the one or more sensors comprise magnetic pick-up coils, Hall-effect sensors, magneto-resistive element (MRE) sensors, and optical sensors.

6. The system (300) of claim 1, wherein the one or more sensors (310) is mounted internally to the ISG (312) of the IC engine to determine the stream of pulses, wherein the stream of pulses can be detected with the control unit (325) using any of back EMF measurement, zero-crossing detection, or current sensing (434).

7. The system (300) of claim 1, wherein the one or more engine cycle phases can be detected using the pulsar coil (316).

8. A method for an internal combustion (IC) engine with electric torque assist comprises:

providing, using a one or more sensors (310), a stream of pulses proportional to an instantaneous speed of a crankshaft assembly (305) and a position of a piston assembly reaching a Top Dead Center (TDC) of the IC engine when it is running;

determining, using a control unit (325), the instantaneous speed of the crankshaft assembly (305) using the stream of pulses from the one or more sensors (310);

computing, using the control unit (325), the pulses from the one or more sensors (310) into one or more engine cycle phases comprising a suction stroke, a compression stroke, a power stroke, and an exhaust stroke;

monitoring, using the control unit (325), the instantaneous speed of the crankshaft assembly (305) and speed shortfall in the IC engine;

determining, using the control unit (325), a target value for the electric torque assist by analysing the speed shortfall and the instantaneous speed of the crankshaft assembly (305), or detecting the position of piston assembly by the one or more sensors (310), when the instantaneous speed of the crankshaft assembly (305) is less than a pre-defined threshold speed value of the IC engine; and providing, using the control unit (325), the electric torque assist to an ISG (312) by switching a MOSFET bridge (330) to a motoring mode (M) of the ISG (312) using a MOSFET driver (335) to maintain an optimum electric torque assist throughout the one or more engine cycle phases; and switching, using the control unit (325), the ISG (312) in a generation mode using the MOSFET bridge (330) when the instantaneous speed of the crankshaft assembly (305) is greater than or equal to the predefined threshold speed value of the IC engine.

* * * * *